C. T. HENDERSON.
MOTOR CONTROLLER.
APPLICATION FILED OCT. 17, 1908.
994,159.
Patented June 6, 1911.
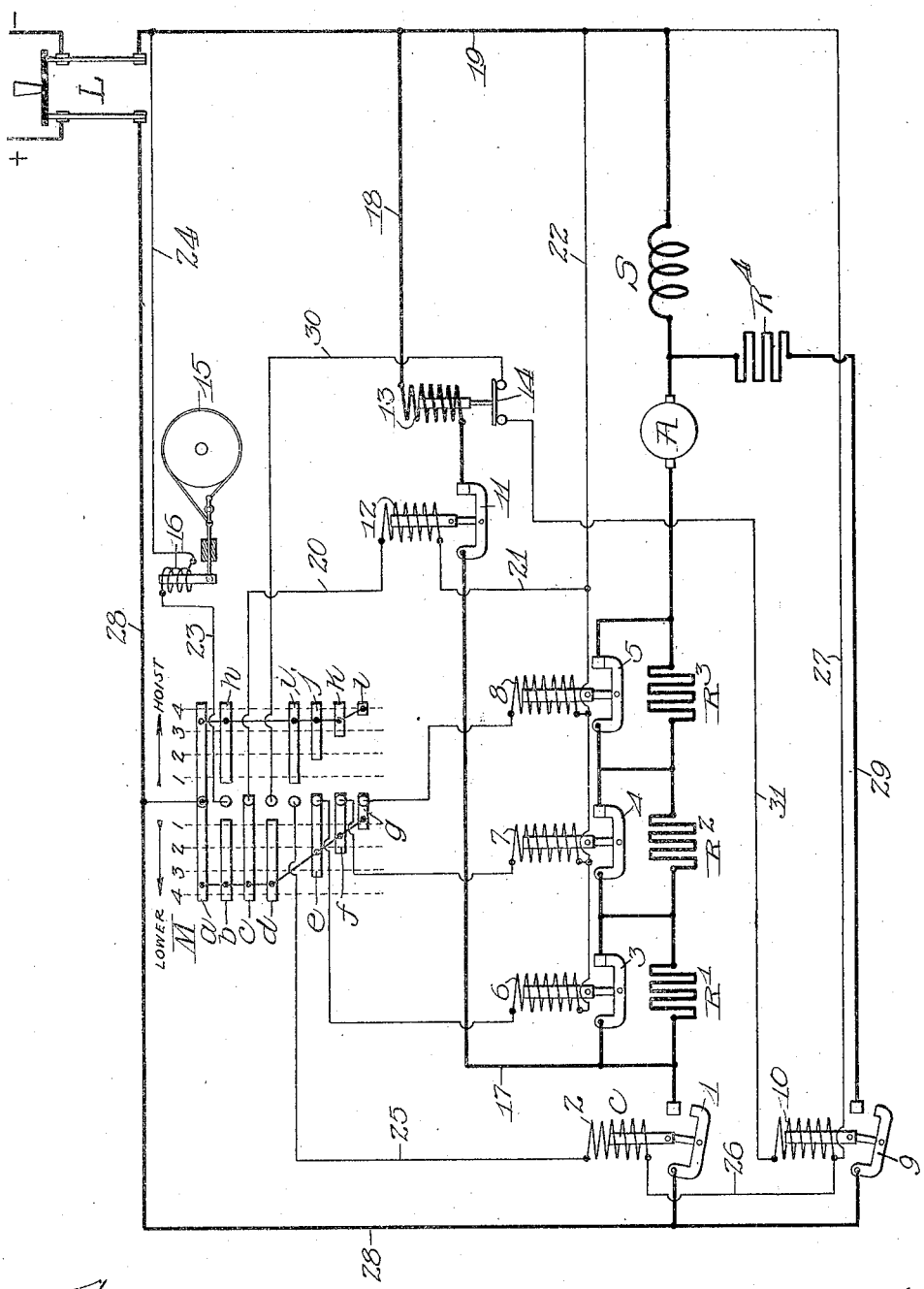
Witnesses:
Robert H. Weir
Shipley W. Fitzgerald
Inventor:
Clark T. Henderson
By: Edwin B. H. Tower, Jr.
Atty.

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

994,159.

Specification of Letters Patent. Patented June 6, 1911.

Application filed October 17, 1908. Serial No. 458,265.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in motor controllers, and particularly to controllers which are used in connection with hoists.

In hoists of many kinds, and particularly those for handling grab buckets, it is very advantageous to use the motor as a dynamic brake in lowering the load. Heretofore it has been the practice to use compound motors for this class of service, as by no other means in existence was it possible to insure the building up of the field when the motor is used as a generator and acts as a dynamic brake. There is objection to using a compound wound motor in practice, as there is always a chance for a short-circuit between the series and shunt windings. A series motor has advantages over a compound motor, when used in hoists, as it has better speed characteristics for this class of service, and also because there is no possibility of a short circuit in the field winding, but series motors have not been used heretofore because means have not been known by which it would be possible to insure the building up of the series field when the motor is used as an automatic brake in lowering the load. I shall now point out what would be the result if a series motor was used in an ordinary manner. When the mechanical brake of the hoist is released the load will commence to descend, and will drive the motor armature. There is a possibility that the residual field magnetism would be insufficient to permit the motor to build up as a generator, and consequently the load might be dropped completely, even though there was a sufficient amount of residual magnetism in the field for the motor to become a generator. When the load commences to descend, the load will invariably drop a certain distance, usually several feet or more, before the field strength becomes sufficient for the motor to operate as a generator and act as a dynamic brake; hence, there would always be a sudden and abrupt stop of the load, which would cause an undue strain upon the cables, drums and other apparatus of the hoist.

My invention has for its object to provide means for insuring the building up of the field strength of the motor the instant the load commences to descend.

According to my invention, I provide means by which the series field is energized by current taken from a suitable source whereby said field is fully energized the instant the load commences to descend. Hence, I overcome the difficulties that would otherwise arise in using a series motor, and, at the same time, I obtain the advantages of using a series motor instead of a compound wound motor.

For the purpose of further disclosing the nature of my invention I shall describe the controller, which is illustrated diagrammatically in the accompanying drawing. The drawing merely illustrates the general principles of my invention and simply shows diagrammatically the manner in which it may be embodied. I have made no attempt in the drawing to illustrate all of the apparatus which would be used in my controller in practice, but have eliminated many devices that would be used, so as to simplify the description of my invention. The drawing should, therefore, be construed in an illustrative sense and not in a limiting manner.

The series motor has an armature A and a series field S. The circuit to the motor is controlled by a main switch 1, which is actuated by a solenoid 2. Resistances $R^1$, $R^2$ and $R^3$, are arranged in series with the motor and are controlled by switches 3, 4 and 5, which are actuated by solenoids 6, 7 and 8, respectively. A switch 9, which is actuated by solenoid 10, is provided for the purpose of connecting a point between the motor armature and the series field when the load commences to descend. The circuit, which is controlled by the switch 9, includes a resistance $R^4$, a circuit across the motor armature, or, in other words, the dynamic brake circuit, is controlled by a switch 11, which is actuated by a solenoid 12. When this switch is closed and the switches 3, 4 and 5, are open, the armature, the series field, and resistances R¹, R² and R³, are connected in a closed loop, as well as an operating solenoid 13 of a relay switch 14 which controls the circuit of the winding of the solenoid 10. The purpose and operation of the various switches, which have previously been mentioned, will hereinafter be more fully described.

The operation of the various switches is directed by means of a master controller M. It has been assumed that the drum type of master controller is employed, and a development of this controller is illustrated in the drawing. Extending around both sides of the drum is a segment $a$, upon the left hand side of the drum are arranged segments $b$, $c$, $d$, $e$, $f$ and $g$, and upon the other side segments $h$, $i$, $j$, $k$ and $l$. Suitable contact fingers are provided to engage these segments as the drum is moved, and these fingers are illustrated by means of circles, which are arranged in alinement down the center of the development. The development illustrates the master controller as it is when it is in the central or off position. If it is turned in one direction the right hand segments will engage the fingers and the load will be hoisted, and if moved in the other direction the left hand segments will engage the fingers and the load will be lowered. The controller has four different positions on each side, which are illustrated by dotted lines. When it is in the off position the segments $c$, $e$, $f$ and $g$, are engaged by their respective fingers as well as the segment $a$. The mechanical brake 15 of the hoist is adapted to be released by means of a solenoid 16, the circuit of which may be controlled in any suitable manner. For the purpose of simplifying the illustration, I have illustrated it as controlled directly from the master controller. The positive and negative lines, from which current is taken, are provided with a suitable line switch L. The various segments of the master controller are electrically connected, and the finger of the segment $a$ is connected to the positive line.

I shall now describe the operation of my controller.

Let it be assumed that the load is at the bottom. Switches 3, 4, 5 and 11, are now closed, and hence the dynamic braking circuit is completed from the armature A through switches 5, 4, 3, conductor 17, switch 11, solenoid 13, conductor 18, conductor 19, series field S, back to the armature. Circuit of the solenoid 12 extends from segment $c$ through conductor 20, solenoid 12, conductor 21, conductor 22, to the negative line. The circuits of solenoids 6, 7 and 8, extend from the segments $e$, $f$ and $g$, through these solenoids in parallel, and thence through conductor 22 to the negative line. The load may be hoisted by moving the right hand segments into engagement with the fingers. As the controller is moved to the first position solenoids 6, 7, 8 and 12, are de-energized, while the brake solenoid 16 and main switch solenoid 2 are energized, and accordingly the mechanical brake is released and the motor circuit is closed. The de-energization of solenoids 6, 7 and 8, opens switches 3, 4 and 5, thereby inserting resistances R¹, R² and R³, in circuit with the motor armature. The circuit of the brake solenoid extends from segment $h$ through conductor 23, solenoid 16, conductor 24, to the negative line. The circuit of solenoid 2 extends from segment $i$ through conductor 25, conductor 26, conductor 27, to the negative line. The motor circuit is now closed from the positive line through conductor 28, main switch 1, resistances R¹, R² and R³, motor armature A, series field S, and conductor 19, to the negative line. As the master controller is moved to the second, third and fourth positions, the segments $j$, $k$ and $l$, engage their respective fingers successively, thereby energizing solenoids 6, 7 and 8, which actuate their switches 3, 4 and 5, one after the other, to remove resistances R¹, R² and R³ from circuit to bring the motor up to full speed. The motor is now hoisting the load. When the load reaches the desired height the master controller is returned to the central position, whereupon the circuits, which have previously been described, are established, hence the motor circuit is opened by the main switch 1. The resistances R¹, R² and R³, after being reinserted to slow down the motor, are removed from circuit and the dynamic brake circuit is closed by the switch 11, hence the motor becomes a generator and acts as a dynamic brake, thereby quickly bringing the apparatus to rest. Meanwhile the mechanical brake is applied, and hence the hoist is now held at rest.

To lower the load the master controller is moved to bring the left hand segments into engagement with their respective contact fingers. When the controller reaches the first position the solenoid 16 is energized through segment $b$, thereby releasing the mechanical brake. Also solenoid 10 is energized and closes the series field circuit through resistance R⁴, hence the series field is energized by current taken from line, which current flows from positive line through conductor 28, switch 9, conductor 29, resistance R⁴, series field S and conductor 19, to the negative line. The circuit of the solenoid 10 extends from segment $d$ through conductor 30, relay switch 14, conductor 31, solenoid 10 and conductor 27 to the negative line. The mechanical brake being now released, the load commences to descend and drives the motor armature. Inasmuch as the series field is energized by current taken from line, the motor instantly becomes a generator and acts as a dynamic brake. The braking current is sent from the armature through the series field S, through conductors 19 and 18, solenoid 13, switch 11, conductor 17, switches 3, 4 and 5, back to the armature. The master controller is now moved through the second, third and fourth positions, thereby causing segments *g*, *e* and *f*, to open the circuits of the solenoids 8, 7 and 6, respectively. Accordingly switches 5, 4 and 3, are opened, one after the other, thereby inserting resistances $R^3$, $R^2$ and $R^1$, in the dynamic braking circuit. The load is thus allowed to descend at full speed. As soon as the armature A commences to generate current and send it through the braking circuit, the solenoid 13 responds and opens relay switch 14, which deënergizes solenoid 10, thereby opening switch 9. The series field S is now energized by the current generated by the armature, as it is no longer necessary to energize it by current taken from the line. It is particularly advantageous to provide the relay switch 14 for opening the energizing circuit of the series field when the armature commences to send current through this field, as otherwise the unequal flow of current through the series field and the armature would cause the series field to become much hotter than the armature, which would be very objectionable. If the motor armature should, at any time, cease to generate current from any cause whatever, the cessation of current through the relay 13, would cause the relay switch 14 to close the circuit of solenoid 10, thereby again closing switch 9. Accordingly the series field will always be energized whenever the armature is naturally generating current while the load is descending.

What I claim as new and desire to secure by Letters Patent is:—

1. In a controller for causing a series motor to generate current, comprising means for establishing circuit connections for separately exciting the series field and automatically interrupting said means after the motor commences to generate current.

2. In a controller for series motors, in combination, means for establishing a dynamic braking circuit for the motor, including the series field, and automatically controlled means for temporarily exciting the series field from an external source.

3. In a controller for a series motor, means for causing the energization of the series field by current taken from an external source when the motor becomes a generator, and automatic means for stopping the external energization of said field whenever the armature commences to generate current.

4. In a controller for series motors, in combination, means for energizing the series field from an external source of power, and a relay switch for stopping the external energization of said series winding whenever the motor armature commences to generate current.

5. In a controller for series motors, in combination, a switch for closing a circuit to energize the series field from an external source of power when the motor becomes a generator, and a relay for automatically opening said switch whenever the armature generates current.

6. In a motor controller for series motors, in combination, a switch for controlling a dynamic brake circuit around the motor, another switch for closing a circuit to energize the series field from an external source of power, and a relay for opening the second mentioned switch when the motor armature commences to generate current.

7. In a motor controller for series motors, in combination, a switch for controlling a dynamic brake circuit around said motor, another switch for closing a circuit to energize the series field from an external source of power, and a relay for opening the second mentioned switch when the motor armature commences to generate current, said relay having its winding connected in the circuit around said motor.

8. In a controller for series motors, in combination, a switch for connecting a point between the motor armature and its field to one side of the line, a resistance included in the circuit controlled by said switch, another switch for connecting a circuit around the motor, and a relay for automatically opening the first mentioned switch when the armature commences to generate current.

9. In a controller for series motors for hoisting apparatus, the combination of resistance controlling switches, a braking switch for closing a circuit to include the motor armature, its field and the resistances, to cause said motor to act as a generator, and means for temporarily closing a circuit to energize said series field from an external source.

10. In a controller for series motors for hoisting apparatus, the combination of resistance controlling switches, a switch for closing the motor circuit, a braking switch for closing a circuit to include the motor armature, its field and the resistances, to cause said motor to act as a generator, and a switch for closing a circuit to energize said series field from an external source, and automatic means for opening the last mentioned switch when the motor armature commences to generate current.

11. In a controller for series motors for hoisting apparatus, the combination of resistance controlling switches, a switch for closing the motor circuit, a braking switch for closing a circuit to include the motor armature, its field and the resistances, to cause said motor to act as a generator, and a switch for closing a circuit to energize said series field from an external source, and a relay for opening the last mentioned switch whenever the armature commences to generate current, said relay switch having its winding connected in the circuit around said motor.

12. In a controller for series motors for hoisting apparatus, the combination of a master controller, resistance controlling switches, a main switch for closing the motor circuit to connect the motor to the line, a switch for connecting a dynamic braking circuit around the motor armature to include said armature, its series field and the resistances, a switch connecting a point between the motor armature and the series field to one side of the line to energize said field from the line, and resistances included in the circuit from said last mentioned switch, and a relay switch for opening the last mentioned switch when the armature commences to send current through the series field, said relay switch having its winding connected in the braking circuit.

13. In a controller for electric motors, in combination, a switch to close a braking circuit across the terminals of the motor armature, a switch to close a circuit to energize the series field of the motor from an external source, and a relay included in said braking circuit adapted, when energized, to interrupt the circuit of said last mentioned switch.

14. In a controller for electric motors, in combination, a switch to close a dynamic braking circuit for the motor, a switch to close a circuit to energize the series field of the motor from an external source, a relay included in said braking circuit adapted, when energized, to interrupt the circuit of said last mentioned switch, and a master switch for controlling the energization of said switches.

15. In a controller for electric motors, in combination, an electromagnetic switch to close a dynamic braking circuit for the motor, an electromagnetic switch to close a circuit to energize the series field of the motor from an external source, a relay included in said braking circuit adapted, when energized, to interrupt the circuit of said last mentioned switch, a plurality of sections of resistance adapted to be included in said dynamic braking circuit, electromagnetic switches to control said resistance sections, and a master switch to control the energization of all of said switches.

In witness whereof, I have hereunto subscribed my name in the presence of two witnesses.

CLARK T. HENDERSON.

Witnesses:
 FRANK H. HUBBARD,
 S. W. FITZ GERALD.